US008620739B1

(12) United States Patent
Frederick et al.

(10) Patent No.: US 8,620,739 B1
(45) Date of Patent: Dec. 31, 2013

(54) DYNAMIC CONVERSION AND USE OF NON-MONETARY REWARDS

(75) Inventors: Robert Frederick, Seattle, WA (US); Toni R. Reid Thomelin, Seattle, WA (US); Eugene Wei, New York, NY (US)

(73) Assignee: Amazon Technologies, Inc., Incline Village, NV (US)

( * ) Notice: Subject to any disclaimer, the term of this patent is extended or adjusted under 35 U.S.C. 154(b) by 2215 days.

(21) Appl. No.: 11/004,701

(22) Filed: Dec. 3, 2004

(51) Int. Cl.
*G06Q 30/00* (2012.01)
(52) U.S. Cl.
USPC ..................................... 705/14.33
(58) Field of Classification Search
None
See application file for complete search history.

(56) References Cited

U.S. PATENT DOCUMENTS

| | | | |
|---|---|---|---|
| 5,774,870 A | 6/1998 | Storey | 705/14 |
| 5,937,391 A * | 8/1999 | Ikeda et al. | 705/14 |
| 6,009,412 A | 12/1999 | Storey | 705/14 |
| 6,032,136 A | 2/2000 | Brake, Jr. et al. | 705/41 |
| 6,175,823 B1 | 1/2001 | Van Dusen | 705/26 |
| 6,578,012 B1 | 6/2003 | Storey | 705/14 |
| 6,594,640 B1 * | 7/2003 | Postrel | 705/14 |
| 6,594,644 B1 | 7/2003 | Van Dusen | 705/39 |
| 6,601,761 B1 | 8/2003 | Katis | 235/379 |
| 6,820,061 B2 | 11/2004 | Postrel | 705/14 |
| 2001/0054003 A1 * | 12/2001 | Chien et al. | 705/14 |
| 2002/0082920 A1 * | 6/2002 | Austin et al. | 705/14 |
| 2002/0161630 A1 | 10/2002 | Kern et al. | 705/14 |
| 2003/0200144 A1 * | 10/2003 | Antonucci et al. | 705/14 |

OTHER PUBLICATIONS

Trilegiant Loyalty Solutions, "Loyalty," retrieved Feb. 11, 2005, from http://www.trilegiantloyalty.com/loyalty.html, 1 page.
Cardweb.com, Inc., "MyPoints MasterCard (Apr. 21, 2003)," retrieved Nov. 17, 2004, from http://www.cardweb.com/cardtrak/news/2003/april/21a.html, 1 page.
Mypoints.com, "About Spending," retrieved Nov. 17, 2004, from http://www.mypoints.com/mp/dStatial.show?isref=nmhp.popup.aboutspending.default, 1 page.
Points.com Inc., "Exchange Guide—Make an Exchange for Points," retrieved Nov. 17, 2004, from http://points.com/exchangeGuide4.jsp?com.points.common.util.HttpSynchronizerToken.token=39059..., 1 page.
Points.com Inc. "Help—Auto-Exchange," retrieved Nov. 17, 2004, from http://points.com/help/pointsExchange_howlong.jsp?com.points.common.util.HttpSynchronizerToken.token=39059921222076469, 1 page.

(Continued)

*Primary Examiner* — Daniel Sorkowitz
(74) *Attorney, Agent, or Firm* — Seed IP Law Group PLLC

(57) ABSTRACT

Techniques are described for using loyalty program points and other non-monetary loyalty rewards from a first organization in a monetary manner at a distinct second organization, such as to acquire an item from a merchant at a cost that is reduced by a monetary amount based on the loyalty reward used. In some situations, the first organization programmatically interacts with a merchant to cause a gift certificate to be dynamically created for the merchant in an appropriate monetary amount, and later applies the gift certificate to reduce the cost of the item acquisition. In addition, in some situations such acquiring of items by a user from a merchant is performed based on interactions between the user and the merchant that are performed so as to appear to the user to be with the first organization and such that subsequent interactions continue between the user and the first organization.

66 Claims, 6 Drawing Sheets

(56) References Cited

OTHER PUBLICATIONS

MyPoints.com, Inc., "Join Now!," retrieved Nov. 17, 2004, from http://www.mypoints.com/?MCK=ccb67d8c419bdab1, 4 pages.

Points.com Inc. "Exchange Guide," retrieved Nov. 17, 2004, from http://points.com/exchangeGuide.jsp?com.points.common.util.HttpSynchronizerToken.token=39059921221927919, 2 pages.

Points.com Inc., "Exchange Guide—Make an Exchange for Gift Certificates," retrieved Nov. 17, 2004, from http://points.com/exchangeGuide5.jsp?com.points.common.util.HttpSynchronizerToken.token=39059921221966593, 2 pages.

Points.com Inc., "Exchange Options," retrieved Nov. 17, 2004, from http://points.com/CategoriesList.jsp?com.points.common.util.HttpSynchronizerToken.token=39059921222076469, 2 pages.

Starwood Hotels & Resorts Worldwide, Inc., "Redemption Partners," retrieved Oct. 26, 2004, from http://www.starwood.com/preferredguest/starpoints/merchandise_options.html, 3 pages.

\* cited by examiner

US 8,620,739 B1

DYNAMIC CONVERSION AND USE OF NON-MONETARY REWARDS

TECHNICAL FIELD

The following disclosure relates generally to techniques for using loyalty program points and other loyalty rewards.

BACKGROUND

Merchants use a variety of techniques to establish loyalty with their customers, such as to foster repeat business and referrals from those customers. One popular technique for merchants and other organizations to establish loyalty is to employ a loyalty program (also referred to as "rewards" or "incentive" programs) that allows affiliated users to earn rewards based on their actions. For example, in loyalty programs provided by merchants, customers of the merchants may typically earn loyalty program points for joining the program and for each dollar spent with the merchant, and may later use their earned points to obtain various benefits. Examples of types of merchants that often provide such loyalty programs include airlines (e.g., via frequent flier programs), rental car companies, hotels, credit card companies, online and brick-and-mortar retailers of various types, etc.

As noted, after users earn sufficient loyalty program points from an organization, they can typically use those points to gain various benefits from the organization. In particular, a user may be able to use loyalty program points from an organization to obtain discounts on and/or free copies of items from the organization (including products, goods, services, information, etc. that are available from the organization for purchase, rent, lease, license, trade, evaluation, sampling, etc.). For example, a user having sufficient loyalty program points from an airline may be able to obtain one or more free flights from the airline and/or one or more upgrades from a basic level of service to a higher level of service (e.g., to upgrade to first class). Similarly, a user having sufficient loyalty program points from an online retailer may be able to acquire one or more items from the retailer at a discount or for free.

In some situations, an organization may allow users having points in the organization's loyalty program to use those points to gain benefits from other affiliated organizations. Thus, for example, a user having sufficient loyalty program points with a first merchant may be able to obtain a gift certificate from a second merchant who is affiliated with the first merchant. After receiving that gift certificate, the user may then use the gift certificate to assist in acquiring goods from the second merchant. Such inter-organization use of loyalty program points provides expanded options for customers of the first merchant to benefit from the loyalty program, thus enhancing the value of the program to the customer, as well as providing benefits to the first and second merchants.

Unfortunately, such inter-organization use of loyalty program points also creates various problems. One significant problem is that the conversion of loyalty program points from a first organization to a gift certificate or other benefit from a second organization is typically a time-consuming process that may take numerous days and is susceptible to manual processing errors at one or both of the organizations. Thus, a user may be disinclined to engage in such a conversion, lowering the value to the first organization in providing such an option for loyalty point use. Moreover, by directing a user to engage in transactions directly with the second organization, a user may be less inclined to continue engaging in additional transactions with the first merchant.

DETAILED DESCRIPTION

Figure 1:
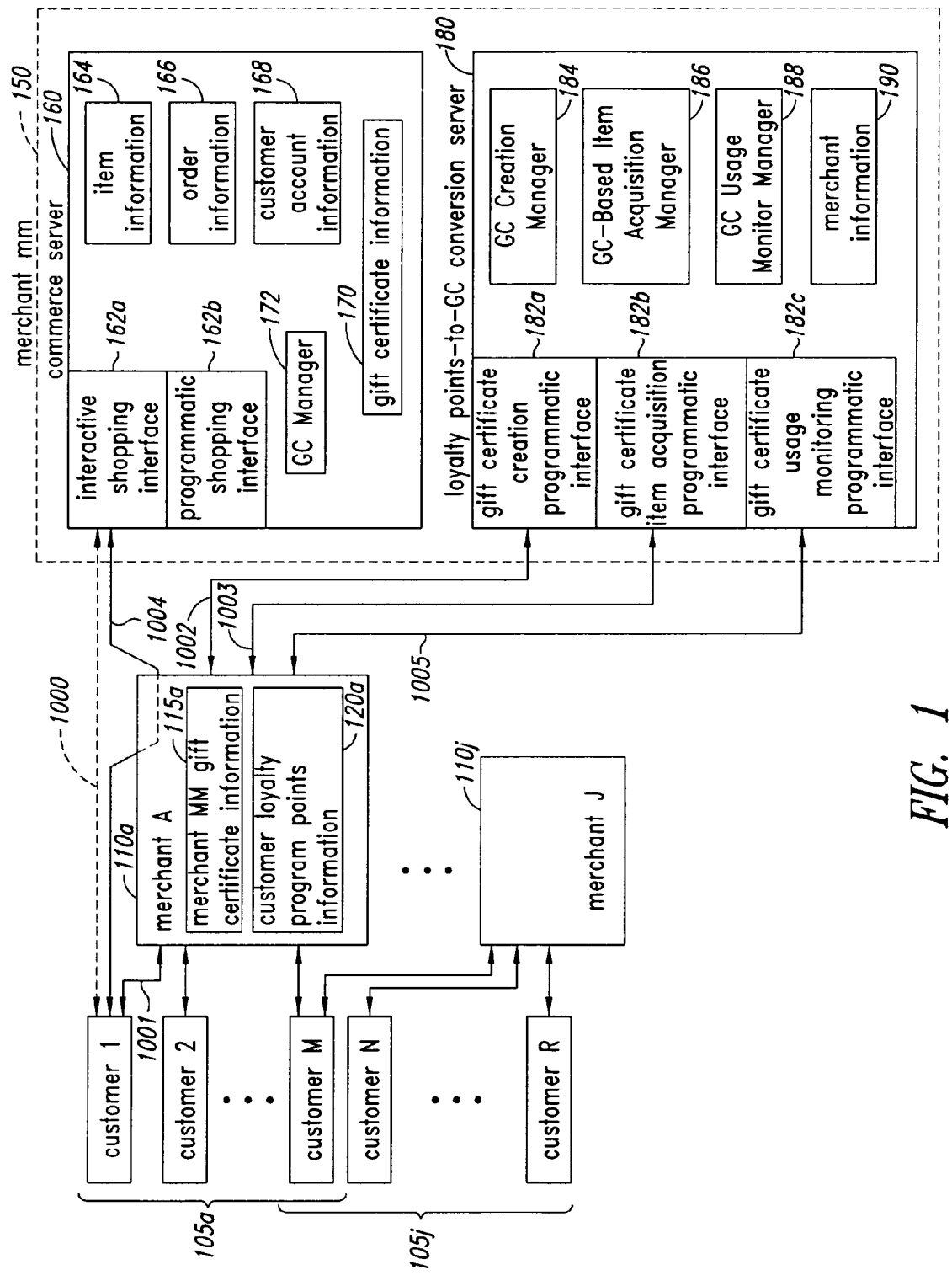
FIG. 1 is a network diagram illustrating components and information flow of an example embodiment of a system providing the described techniques.

A software facility is described that facilitates using loyalty program points and other non-monetary loyalty rewards from a first organization to gain a monetary benefit at a distinct second organization. In some embodiments, the second organization is a merchant (e.g., a Web retailer or other online retailer), and the use of the loyalty rewards from the first organization includes acquiring items from the merchant at a cost that is reduced by a monetary amount based on the loyalty reward used (e.g., based on the number of loyalty program points). In addition, in some such embodiments providing of the items from the merchant to a user is based on interactions between the user and the merchant that are performed in such a manner as to appear to the user to be with the first organization and such that subsequent interactions continue between the user and the first organization.

In particular, in some embodiments a user first interacts with one or more computing systems of a first organization from which the user has earned loyalty program points, such as based on one or more Web pages provided to the user by the computing systems. After the user selects to use at least some of his/her earned loyalty program points in a monetary manner to facilitate acquiring one or more items from a second merchant (e.g., by using a user-selectable control on one of the provided Web pages), a computing system of the first organization interacts with one or more computing systems of the second merchant to provide information about those loyalty program points and to obtain an indicator for a gift certificate of the second merchant, with the gift certificate being dynamically created by the second merchant so as to have an amount that is based on those loyalty program points. When the user is ready to acquire one or more indicated items of the second merchant (e.g., as indicated by the user based on a selection of a user-selectable control on a Web page from the first organization), a computing system of the first organization provides that information to a computing system of the second merchant along with the gift certificate indicator.

A computing system of the second merchant then dynamically assumes control of interactions with the user in order to complete the item acquisition transaction (e.g., by sending one or more Web pages to the user to obtain item delivery information and/or information regarding additional payment for the item acquisition), with the cost of the item acquisition reduced by the amount of the gift certificate. In at least some embodiments, the interactions with the user by the second merchant are performed so as to appear to the user to continue to be with the first organization (e.g., by the Web pages from the second merchant including logos of the first organization and/or other information to provide a visual representation similar or identical to that of the Web pages provided to the user by the first organization). After the item acquisition transaction is completed by the computing system(s) of the second merchant, control of further interactions with the user is returned to the first organization so that the user can continue to interact with one or more computing systems of the first organization. The various described activities can each be performed in various ways in various embodiments, as discussed in greater detail below.

FIG. 1 illustrates an example embodiment of a system for using loyalty program points of merchants in a monetary manner at another merchant. In particular, in the illustrated embodiment various customers 105 are interacting with various merchants 110, with a group 105a of customers interacting with Merchant A and a group 105j of customers interacting with Merchant J. As is shown in detail with respect to Merchant A, each of the merchants 110 may provide a loyalty program for its customers, and may store information 120 about the loyalty program points earned by its various customers. In addition, some customers may interact with multiple merchants, such as Customer M illustrated as interacting with both Merchant A and Merchant J.

As an illustrative example of using loyalty program points of one of the merchants 110 to assist in acquiring one or more items from another merchant, consider interactions between Customer 1 and Merchant A. In particular, in the illustrated embodiment, computing systems (not shown) of Customer 1 and Merchant A perform various interactions 1001 in which Merchant A provides various information to Customer 1 using one or more Web pages (not shown), and in which Customer 1 provides various instructions to Merchant A (e.g., via selections of user-selectable controls on those Web pages). For example, Merchant A may provide information to Customer 1 to indicate information about its loyalty program, such as a current number of earned loyalty program points for Customer 1, information about opportunities to earn more loyalty program points, and opportunities for Customer 1 to use earned loyalty program points to obtain benefits from Merchant A.

In addition, Merchant A also provides information to Customer 1 in the illustrated embodiment about one or more options for using earned loyalty program points to obtain benefits from distinct Merchant MM 150, such as information about specific items available from or via Merchant MM (e.g., items that are not available from Merchant A) that may be obtained at specific discounts or specific discounted prices by using specific numbers of earned loyalty program points. For example, Merchant A may provide information to Customer 1 to indicate that an item AA (not shown) has a normal price of $100, but that Customer 1 may obtain a $30 discount on item AA by using 500 of his/her loyalty program points from Merchant A. Alternatively, Merchant A may inform Customer 1 that he/she may obtain item AA for $70 by using 500 loyalty program points, but without indicating details of the original price or of the specific amount of the discount. In some embodiments, such information may be provided about multiple items from one or more other merchants, and multiple options for using loyalty program points may further be provided in some situations (e.g., to use 500 loyalty program points to obtain a $30 discount on item AA, to use 1000 loyalty program points to obtain a $65 discount, or to use 500 loyalty program points to obtain an item BB normally priced at $25 for free). Furthermore, in some embodiments such information about available items may be provided to Customer 1 without any price-related information, such as to merely indicate that item BB is available for 500 loyalty program points (e.g., without providing any options for using fewer loyalty program points to obtain only a partial discount on the cost of the item).

In this manner, Merchant A may select specific items available from Merchant MM to make available to Customer 1 as options to be acquired using his/her loyalty program points, such as items selected to reinforce Merchant A's brand or image. Merchant A may select items as options for customers in various ways, such as to select different items for different customers and/or to dynamically vary items being offered based on various factors (e.g., based on a price of the item at Merchant MM and/or based on any incentives offered by Merchant MM to Merchant A related to specific items). In addition, Merchant A in some embodiments may dynamically vary the monetary values corresponding to specified numbers of loyalty program points in various ways, such as based on the customer (e.g., on a value of the customer to Merchant A and/or on other information about the customer), on a number of earned points that a customer has, on current market conditions, on a current day and/or time, etc. In some embodiments, Merchant MM may further offer items from one or more other partner merchants or otherwise affiliated other merchants (not shown) or otherwise facilitate acquisition of items from such other merchants (e.g., if Merchant MM provides order processing capabilities for those other merchants while they handle order fulfillment, or if Merchant MM provides order processing and order fulfillment for those other merchants while they handle other business activities), the items offered by Merchant A to Customer 1 may include items from one or more of those other merchants. Moreover, in some embodiments Customer 1 may be informed that item AA will be supplied by Merchant MM (or another merchant affiliated with Merchant MM) rather than Merchant A, while in other embodiments Customer 1 may not receive any information about item AA being supplied by a merchant other than Merchant A, or may merely be informed that item AA will be provided by a merchant other than Merchant A without including details of the identity of Merchant MM.

To enable providing information to Customer 1 about specific items available from Merchant MM at specific prices, Merchant A may obtain such information in various ways. In some embodiments, such information may be previously obtained by Merchant A in an offline manner and stored for later use. Alternatively, Merchant A may retrieve information from Merchant MM dynamically in a programmatic manner at the time of the interactions with Customer 1, such as based on an appropriate API ("application programming interface") provided by Merchant MM. In particular, in the illustrated embodiment Merchant MM has one or more commerce servers 160 with which users and affiliated organizations can interact to perform shopping-related activities. The servers 160 in the illustrated embodiment include both an interactive shopping interface 162 with which customers can interact to perform shopping-related activities (e.g., based on Web pages provided to the customers from the commerce servers) and a programmatic shopping API 162b with which appropriate executing programs can programmatically interact to exchange shopping-related information. Thus, for example, an executing program on a computing system of Merchant A may use the API 162b to programmatically interact with a Merchant MM commerce server to obtain information about items currently available from Merchant MM, such as from stored item information 164.

Such programmatic interactions between programs and computing systems may occur in various ways, such as by Merchant A invoking one or more Web services provided by Merchant MM as part of the API 162b. More generally, various mechanisms exist to allow computers and executing software applications to programmatically interact. For example, remote procedure call ("RPC") protocols have long existed that allow a program on one computer to cause a program on another computer to be executed, and various object-oriented architectures such as CORBA ("Common Object Request Broker Architecture") and DCOM ("Distributed Component Object Model") provide similar capabilities. In addition, a variety of middleware programs have been implemented to connect separate applications (often of distinct types and from unrelated sources) to allow communication. Various EDI ("Electronic Data Interchange") networks also exist that provide standard mechanisms to allow a computer system of one user of the network to send data to a computer system of another user of the network. The widespread popularity of the World Wide Web ("Web") has provided additional opportunities for computers to inter-communicate. For example, while much current Web use involves users interactively requesting Web pages from Web servers (e.g., via executing Web browser applications of the users) and receiving the requested information in response, there is also growing use of the Web to support the programmatic interaction of remote applications to exchange information via defined APIs, such as via Web services. Such Web services allow heterogeneous applications and computers to interact, and can be defined and implemented using a variety of underlying protocols and techniques. For example, some Web service implementations return data in XML ("eXtensible Markup Language") format using HTTP ("HyperText Transport Protocol") in response to a Web service invocation request specified as a URI ("Uniform Resource Identifier"), such as a URL ("Uniform Resource Locator") that includes a specified operation and one or more query parameters. In other implementations, additional underlying protocols are used for various purposes, such as SOAP ("Simple Object Access Protocol") for standard message exchange, WSDL ("Web Services Description Language") for description of service invocations, and UDDI ("Universal Description, Discovery, and Integration service") for discovery of available services.

After Customer 1 selects an option provided by Merchant A to use a specified number of loyalty program points to facilitate acquiring one or more items from Merchant MM, such as to use 500 loyalty program points from Merchant A to obtain a $30 discount on item AA, Merchant A dynamically interacts with Merchant MM in a programmatic manner to initiate that item acquisition. In particular, in the illustrated embodiment Merchant A programmatically interacts with Merchant MM to cause a $30 gift certificate from Merchant MM to be created, and then uses that gift certificate as part of acquiring item AA. The dynamic gift certificate creation process is enabled in this illustrated embodiment by a loyalty points-to-gift certificate (or "LPTGC") conversion server 180 that is provided by Merchant MM, although in other embodiments such an LPTGC conversion server could be provided in other manners (e.g., by using an LPTGC conversion server that is independent from any particular merchant, such as to provide functionality for Merchant MM and for multiple other unrelated merchants, or instead by Merchant MM incorporating some or all of the functionality of the LPTGC conversion server as part of one or more of the commerce servers 160).

In the illustrated embodiment, the LPTGC conversion server provides an API 182 to allow various functionality to be programmatically accessed. Thus, to initiate the Merchant MM gift certificate creation based on Customer 1's selection, Merchant A performs programmatic interactions 1002 with a portion 182a of the LPTGC conversion server API to provide information about the gift certificate to be created and, after a gift certificate for Merchant MM in the amount of $30 is dynamically created, to receive an indicator (e.g., a unique identifier) for the gift certificate from the LPTGC conversion server for later use in referencing the gift certificate. Various information 115a regarding the created gift certificate may then be stored by Merchant A, such as the indicator, an indication of the gift certificate amount, an indication that the gift certificate is for the benefit of Customer 1, an indication of the loyalty program points used for the gift certificate, etc. The interactions to cause the gift certificate to be created may be performed in various ways, including by Merchant A providing information about the specific amount of the gift certificate (e.g., without providing information about how many loyalty program points are being used and/or about which customer has initiated the gift certificate creation), about the specific loyalty points selected, about the customer for whom the gift certificate is being created, and/or about one or more items to be acquired using the gift certificate. If Merchant A does not provide information about the specific amount of the gift certificate, the LPTGC conversion server and/or Merchant MM may automatically determine a corresponding value for a specified loyalty program reward in various ways, such as based on previously acquired information about how to convert loyalty program points from Merchant A to gift certificate amounts (e.g., based on a prior registration or setup process performed by Merchant A), based on information obtained from a third party regarding a value to assign (e.g., by offering the loyalty program rewards for sale to other users), based on current market conditions for the LPTGC conversion server and/or Merchant MM (e.g., current demand for some or all items, such as the items indicated to be acquired), on information about the customer for whom the gift certificate is being created (e.g., based on a value of the customer to Merchant MM and/or on other information available to the LPTGC conversion server and/or Merchant MM about the customer), and/or based on currency values for a currency in which the gift certificate amount will be represented.

After the LPTGC conversion server receives the information from Merchant A via the API 182a, the information is forwarded to a Gift Certificate ("GC") Creation Manager component 184 for processing. In the illustrated embodiment, the GC Creation Manager first authenticates that Merchant A is who provided the information (e.g., based on a credential or other identifying information provided by Merchant A), and then validates that Merchant A is authorized to request this gift certificate creation. In particular, the LPTGC conversion server may enforce restrictions of various types for some or all of the merchants 110 who access the functionality provided by the LPTGC conversion server, including how often a merchant may request gift certificate creation and what gift certificate amounts may be requested (e.g., to enforce minimum or maximum thresholds, or to enforce that amounts be in a certain form, such as in multiples of $5 dollars). More generally, in some embodiments some or all merchants may need to have a predefined account with the LPTGC conversion server before requesting gift certificate creation, such as based on a prior registration by the merchant with the LPTGC conversion server, and if so the GC Creation Manager may use stored merchant information 190 to verify whether such an account exists and whether any merchant-specific restrictions on gift certificate creation exist.

In addition to validating that Merchant A is authorized to request the gift certificate creation, the GC Creation Manager may also verify that Merchant A has sufficient funds or is otherwise capable of providing for payment to cover the amount of the gift certificate (or that Merchant A is allowed to perform the gift certificate creation without such sufficient payment), as in at least some embodiments Merchant A will compensate Merchant MM in an amount based on the amount of the gift certificate (e.g., the exact amount of gift certificate, the gift certificate amount minus a referral fee to Merchant A, the gift certificate amount plus a processing fee charged by Merchant MM and/or an independent LPTGC conversion server, etc.). Moreover, in some embodiments Merchant MM may take steps to immediately obtain compensation from Merchant A for the gift certificate, such as debiting an account of Merchant A, generating an invoice to be sent to Merchant A, etc.

If Merchant A is not sufficiently authenticated or the creation of the gift certificate is not sufficiently validated or otherwise authorized, an error message may be programmatically returned to Merchant A. Otherwise, the GC Creation Manager proceeds to cause the gift certificate to be dynamically generated and to send an indicator for the gift certificate to Merchant A, as well as to store information about the gift certificate creation with various stored merchant-related information 190 (e.g., to store a generated transaction identifier along with information about the gift certificate created during the transaction). In particular, in the illustrated embodiment the commerce server includes a GC Manager component 172 via which gift certificates can be created, such as by customers via the interactive shopping interface 162a. The GC Creation Manager programmatically interacts with the GC Manager (e.g., via the programmatic API 162b) to cause the gift certificate to be created, and the GC Manager stores information about the gift certificate (e.g., the amount, any time-related or other restrictions on the use of the gift certificate, and an indication of Merchant A or of another entity authorized to use the gift certificate as part of a transaction, such as Customer 1 in some embodiments if that information is provided to Merchant MM) as part of gift certificate information 170 on the commerce server. In the illustrated embodiment the GC Manager generates and provides the indicator for the gift certificate to the GC Creation Manager for forwarding to Merchant A. In other embodiments, the gift certificate creation may be performed in other manners, such as by having a single Merchant MM component that handles the gift certificate creation, or by directing Merchant A's computing system to programmatically interact directly with the GC Manager component after the gift certification creation is validated and authorized.

In addition to performing programmatic interactions 1002 to initiate creation of the gift certificate, Merchant A may also perform other interactions with Merchant MM. For example, if Customer 1 has not indicated to immediately complete the acquisition of item AA, a computing system of Merchant A may programmatically interact (not shown) with the commerce server via the programmatic API 162b in order to add item AA to a virtual shopping cart for Customer 1 at Merchant MM. To have such a shopping cart at Merchant MM, Customer 1 may need to have an established account with Merchant MM, such as based on optional interactions 1000 that may have previously occurred between Customer 1 and the interactive shopping interface 162a of Merchant MM's commerce server and that are reflected in stored customer account information 168 on the commerce server. If Customer 1 does not have such an account with Merchant MM, Merchant A may instead facilitate dynamic creation of such an account (not shown) for Customer 1, such as by temporarily transferring control of interactions with Customer 1 to the commerce server in order to allow account creation by Customer 1 to occur privately such that Merchant A does not have access to passwords or other private account-related information, or alternatively by Merchant A to participate in such account creation in order to store account-related information for Customer 1 at Merchant MM to facilitate later interactions with Merchant MM on behalf of Customer 1. In some embodiments, Merchant A may further assist in the account creation process by providing information to Merchant MM about Customer 1 that is known to Merchant A, such as Customer 1's name, delivery address and preferred payment source.

After Customer 1 has indicated an intention to Merchant A to complete the acquisition of item AA, such as based on selection of a user-selectable control on a Web page provided to Customer 1 from Merchant A, a computing system of Merchant A dynamically interacts with Merchant MM in a programmatic manner to initiate that item acquisition completion. In particular, Merchant A performs programmatic interactions 1003 with a portion 182b of the LPTGC conversion server API to provide information about the item acquisition and about the gift certificate to be used to reduce the cost of the acquisition (e.g., by supplying the indicator for the gift certificate). After the item acquisition is completed, Merchant MM notifies Merchant A so that interactions between Merchant A and Customer 1 may continue, such as by returning control of interactions with Customer 1 to Merchant A after temporarily assuming such control in order to complete the item acquisition.

The interactions between Merchant A and Merchant MM to initiate the item acquisition completion may be performed in various ways. For example, the initial indication from Customer 1 to Merchant A to select the loyalty point usage option for item AA may have included an indication to immediately complete the item acquisition, and if so the programmatic interactions 1003 may occur immediately after the programmatic interactions 1002. Moreover, in that situation, information about item AA may be provided to Merchant MM as part of the programmatic interactions 1003 rather than by placing that item in a shopping cart for Customer 1. Alternatively, after initially indicating to select the loyalty point option for use with item AA, Customer 1 may have made additional indications to Merchant A of other items to acquire from Merchant MM and/or of other loyalty point usage options to use before ultimately indicating to complete the acquisition of the indicated items, and if so Merchant A performs additional programmatic interactions (not shown) with Merchant MM to create gift certificates corresponding to any such selected loyalty point usage options and/or to provide information about any additional selected items to be acquired. In addition, Merchant A may provide updates to Customer 1 regarding the items currently available in his/her shopping cart based on Customer 1's selections (whether or not the shopping cart information is indicated to Customer 1 to correspond to Merchant MM), such as to include corresponding price information based on the use of the selected loyalty point usage options.

After the LPTGC conversion server receives the information from Merchant A via the API 182b regarding completion of the item acquisition, the information is forwarded to a GC-Based Item Acquisition Manager component 186 for processing. In the illustrated embodiment, the GC-Based Item Acquisition Manager performs initial processing similar to that performed by the GC Creation Manager, including to first authenticate that Merchant A is who provided the information and to then validate that Merchant A is authorized to perform this action.

In addition, in some embodiments the LPTGC conversion server and/or commerce server use additional techniques to verify that created gift certificates are used only by authorized parties. For example, in some embodiments the LPTGC conversion server and/or commerce server generate a unique set of information each time that Merchant A adds an item to Customer 1's shopping cart, and provides that set of information to Merchant A. When Merchant A later initiates the completion of the item acquisition process for Customer 1, Merchant A supplies the last set of information received from Merchant MM for Customer 1. Merchant MM then dynamically generates a new set of information based on the information currently in Customer 1's shopping cart, and verifies that the provided set of information matches the newly generated set of information in order to authorize the item acquisition completion using the indicated gift certificate. As long as the method of generating the set of information provides consistent results based on the items in the shopping cart, this check provides additional assurance that the party indicating to use a gift certificate created on behalf of a merchant is that merchant. The set of information may also be encrypted in various ways before being provided to Merchant A, such as in a 1-way manner to prevent easy modification of the information in the set that is provided back to Merchant MM. Various types of information may be included in the set of information in various embodiments, including a unique identifier for Customer 1 and/or Customer 1's shopping cart, a unique identifier corresponding to Merchant MM and/or the Web site provided by Merchant MM, and/or the indicator or other unique identifier for the gift certificate created for use with acquiring the items in the shopping cart. In addition, various other information may be included in the set of information but not required to be an exact match, such as a timestamp corresponding to when the set of information was generated.

If it is determined that Merchant A is not sufficiently authenticated or that the item acquisition completion is not sufficiently validated or otherwise authorized, an error message may be programmatically returned to Merchant A. Otherwise, the GC-Based Item Acquisition Manager proceeds to interact with the commerce server (e.g., via the programmatic API 162b) to initiate the completion of the acquisition of the item(s) for Customer 1. As part of completing the item acquisition, the GC-Based Item Acquisition Manager and/or commerce server retrieves information from the stored gift certificate information 170 for the one or more gift certificates whose indicators were supplied by Merchant A, so that the values of the gift certificates are applied to the item acquisition cost—if the value of the gift certificate(s) exceed the cost of acquiring the items, the surplus value can be handled by Merchant MM in various ways, such as by applying the amount as a credit to Customer 1's account, by returning the surplus value to Merchant A (e.g., via a newly created gift certificate in that amount), or by retaining the surplus amount as being forfeited. The commerce server also stores information about the item acquisition with stored order information 166, and the LPTGC conversion server stores information about the use of the gift certificate along with merchant information 190 stored on the LPGTC server (e.g., to store a generated transaction identifier to represent the use of the gift certificate during the acquisition of the items, along with the indicator of the gift certificate used).

In the illustrated embodiment, the LPTGC conversion server and/or commerce server assumes temporary control of interactions with Customer 1, and performs interactions 1004 with Customer 1 to obtain any needed information and/or confirmation to complete the acquisition (e.g., to obtain information to authenticate Customer 1, such as based on a password previously defined by Customer 1; to obtain a confirmation by Customer 1 to pay the balanced owed, if any, after applying the discounts associated with the gift certificate(s) being used for the item acquisition; etc.), such as by sending one or more Web pages to Customer 1's computing system via the interactive interface 162a and receiving responses from Customer 1 via selections and/or information provided in forms on the Web page. While in the illustrated embodiment these interactions may occur directly between one or Merchant MM and Customer 1 without Merchant A's involvement, in other embodiments some or all such interactions could instead be controlled (e.g., mediated) by Merchant A, such as is illustrated by the optional portion of the interactions that passes through Merchant A. Alternatively, if the interactions do not include Merchant A, in some embodiments at least some of the information exchanged between Customer 1 and Merchant MM is provided to Merchant A by Merchant MM in order to provide information to Merchant A about the ultimate transaction that involves the use of Merchant A's loyalty program points, such as to notify Merchant A of changes made by Customer 1 to the order when interacting directly with Merchant MM (e.g., to remove indicated items from the order and/or to add additional items to the order)—furthermore, in some embodiments at least some such additional changes to the order may not be allowed, such as based on restrictions on how Merchant A's loyalty program points can be used.

Moreover, in at least some embodiments, the interactions 1004 between Merchant MM and Customer 1 are performed by Merchant MM in such a manner as to minimize or eliminate indications to Customer 1 that the interactions have changed from Merchant A to Merchant MM, such as by Merchant MM storing information about the visual representations that Merchant A uses for its Web pages and using that stored information for its own Web pages when interacting with Customer 1. In that manner, Customer 1 continues to see a consistent visual "storefront" associated with Merchant A, and is more inclined to continue subsequent interactions with Merchant A.

Thus, as described, the LPTGC conversion server facilities using non-monetary loyalty program points from Merchant A in a monetary manner at Merchant MM, such as to benefit Merchant A's customer. While not illustrated in this example, Merchant A can perform many such interactions for its various customers, and other merchants 110 can similarly perform such interactions for their customers. In addition, while the LPTGC conversion server is provided by Merchant MM in this example, in other examples the LPTGC conversion server may provide similar functionality for multiple distinct merchants.

In the illustrated embodiment, the LPTGC conversion server further provides functionality to allow merchants 110 to monitor their use of their loyalty program points. Thus, in the illustrated embodiment, Merchant A performs additional programmatic interactions 1005 with a portion 182c of the LPTGC conversion server API to request and receive information about its use of LPTGC conversion server functionality. After the LPTGC conversion server receives the request from Merchant A, the request is forwarded to a GC Usage Monitor Manager component 188 for processing. In the illustrated embodiment, the GC Usage Monitor Manager performs initial processing similar to that performed by the GC Creation Manager, including to first authenticate that Merchant A is who sent the request and to then validate that Merchant A is authorized to receive the requested information.

If Merchant A is not sufficiently authenticated or the request is not authorized, an error message may be programmatically returned to Merchant A. Otherwise, the GC Usage Monitor Manager retrieves stored merchant information 190 corresponding to the request, and provides the retrieved information to Merchant A. The retrieved information may include, for example, a history of transactions that have used gift certificates created based on loyalty program points from Merchant A, details about one or more transactions whose payment was provided at least in part based on such gift certificates, the status of one or more transactions that use such gift certificates, etc. The information from the LPTGC conversion server may also be provided in a variety of ways, including as a transaction report having various types of information about multiple relevant transactions. Merchant A may supply various criteria related to the information requested, such as a time period of interest, indications of one or more transaction identifiers of interest for which information is desired, indications of one or more transaction report identifiers, etc.

For illustrative purposes, some embodiments have been and will be described in which specific types of loyalty program rewards are used in specific manners to gain specific types of benefits. However, those skilled in the art will appreciate that the techniques of the invention can be used in a wide variety of other situations, and that the invention is not limited to the details discussed in the illustrative examples. For example, while in various places a "merchant" and/or "online retailer" is discussed, it will be appreciated that these terms may include a wide variety of organization and entities, including (without limitation) online shopping malls and item acquisition brokers (including aggregators, consolidators, comparison sites, shopping-related search sites, referral sites, etc.).

As one example, in various embodiments "gift certificates" are created and used by merchants or other organizations. Such gift certificates may generally include a variety of mechanisms for storing monetary value for later use, such as gift cards having a programmable value, smart cards and other cards in which monetary value may be removed and added, coupons having a specified value, discounts and/or credits that are stored and/or used in a manner associated with one or more entities (e.g., by applying them to a monetary balance for an account of a customer or by associating them with an account for later application as directed by an owner of the account), and more generally any gift or other monetary record that stores information about a monetary value available for use (e.g., by information stored in a database). Additional information related to techniques for storing and using monetary values that may be used as gift certificates in at least some embodiments is included in co-pending U.S. patent application Ser. No. 10/894,347, filed Jul. 19, 2004 and entitled "Automatic Authorization Of Programmatic Transactions", which is hereby incorporated by reference in its entirety.

In addition, while in some embodiments gift certificates are created, stored and used without generating a physical embodiment or representation of the gift certificates (e.g., by storing and accessing information related to the gift certificate), in other embodiments such physical embodiments or representations may be created in at least some situations. As one example, the LPTGC Conversion server may cause a gift certificate being created to have a physical representation or embodiment that is then transported or otherwise sent to an indicated recipient. As another example, in some embodiments various types of physical transaction devices may be available to users (e.g., ATM machines, electronic kiosks, coin change machines, etc.), and the devices may allow users to access various functionality related to loyalty program points and/or other loyalty program rewards of the users (e.g., to provide information to the users about such rewards, such as based on interacting with a remote LPTGC conversion server having that information and/or by reading information stored on a physical card or device carried by the user). In particular, the physical transaction devices may be able to perform at least some of the types of functionality of an LPTGC Conversion server (whether as a standalone device or via communications with a distinct network-accessible LPTGC Conversion server), including causing a gift certificate to be created based on loyalty program rewards of the user and/or providing a physical embodiment or representation of a gift certificate for the user (e.g., by printing a paper gift certificate, by electronically adding value to a stored value card of the user, etc.). In some embodiments, a computing system with an appropriate output device may similarly be able to act as a physical transaction device, such as to print a gift certificate on a printer output device and/or to store information about a gift certificate on various types of recordable media. Alternatively, the physical transaction device may in some embodiments not produce such physical embodiments of gift certificates, such as to instead allow the user to associate an electronic gift certificate with an account of the user without providing a physical representation of that electronic gift certificate. More generally, in some embodiments such physical transaction devices may provide functionality to assist users in creating gift certificates at one or more merchants (e.g., merchants that provide the physical transaction devices, that are otherwise affiliated with the devices, that are affiliated with an LPTGC conversion server that provides or is otherwise affiliated with the device, etc.) based on a type of compensation or other value that is unrelated to loyalty program rewards, such as based on money (e.g., an amount of money equal to or greater than the amount of the gift certificate being created) that is supplied by and/or promised by the user (e.g., based on charging a credit card of the user, based on debiting a bank account or other monetary source of the user, based on cash provided by the user to the physical transaction device, etc.)—if so, at least some of the compensation or other value may be provided to the merchant and/or to an LPTGC conversion server affiliated with the device.

Figure 2:
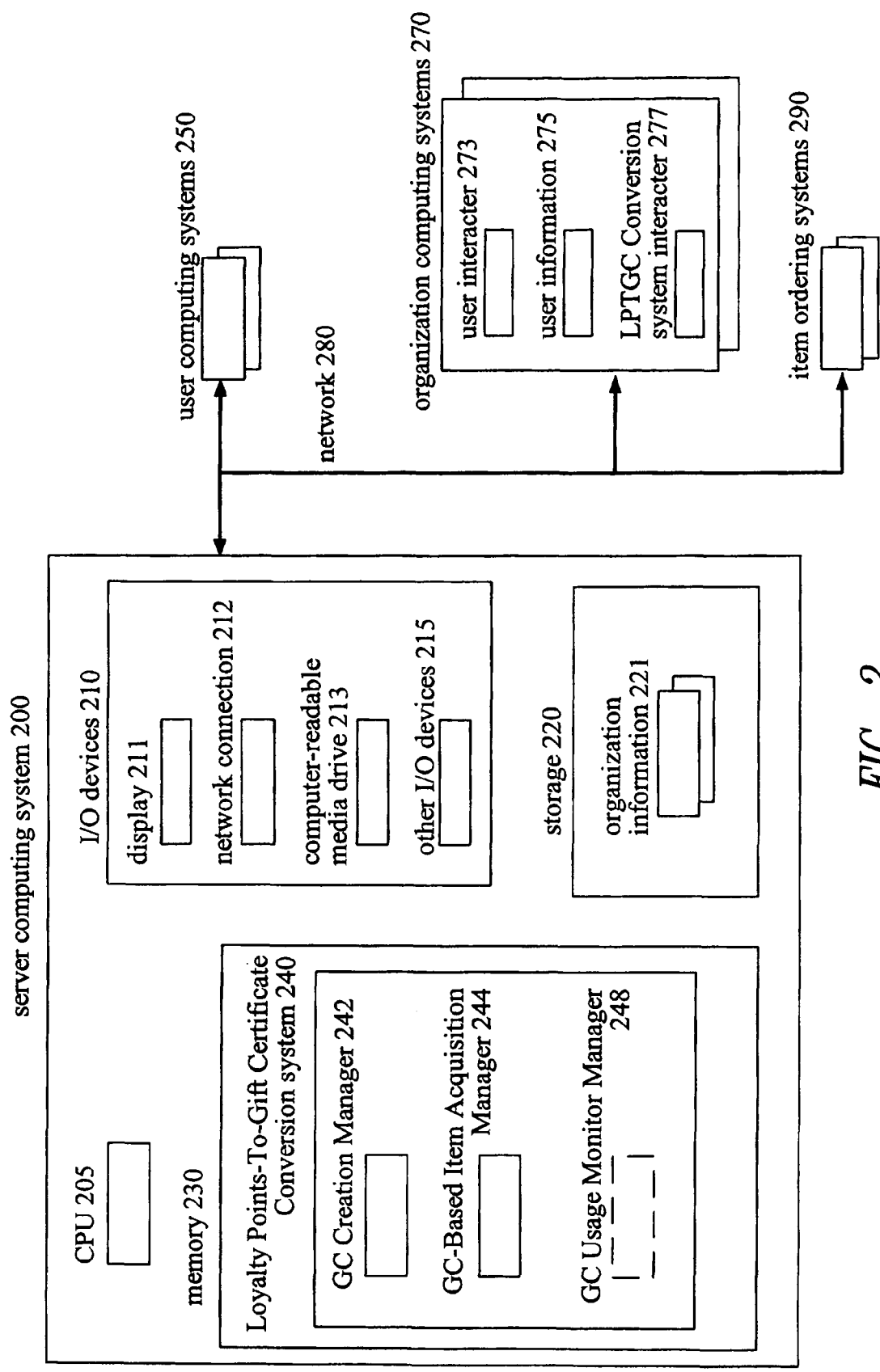
FIG. 2 is a block diagram illustrating an embodiment of a computing system suitable for executing a system providing the described techniques.

FIG. 2 illustrates a server computing system 200 suitable for executing an embodiment of the LPTGC Conversion system facility, as well as other computing systems that may interact with the LPTGC Conversion system. The computing system 200 includes a CPU 205, various input/output ("I/O") devices 210, storage 220, and memory 230. The I/O devices include a display 211, a network connection 212, a computer-readable media drive 213, and other I/O devices 215. An embodiment of the LPTGC Conversion system 240 is executing in memory, and it includes a GC Creation Manager component 242, a GC-Based Item Acquisition Manager component 244, and optionally a GC Usage Monitor Manager component 248.

Various computing systems 270 of organizations having loyalty programs (e.g., merchants) may initially interact with the LPTGC Conversion system in order to define accounts to allow the organizations to use the functionality provided by the LPTGC Conversion system on behalf of users associated with the organizations (e.g., customers of the merchants)—in some embodiments, some or all of the organizations are unaffiliated with the organization providing the LPTGC Conversion system other than based on use of the LPTGC Conversion system's functionality, while in other embodiments some or all of the organizations may instead be affiliated with the organization providing the LPTGC Conversion system in various ways. In response, the LPTGC Conversion system may store various information 221 about each of the organizations, such as information on how the organization will compensate the LPTGC Conversion system for any gift certificates or other benefits having a monetary value that are provided to the organization, and/or information on any restrictions on how and/or when the organization may use functionality provided by the LPTGC Conversion system.

The organization computing systems may also each use a user interacter component 273 (e.g., a Web server program or application program) to interact with various users affiliated with the organization, such as by exchanging information with one or more user computing systems 250. The organization computing systems may also each store various information 275 related to the users, such as information about any loyalty program points or other rewards earned by the users, and may include that information in the information provided to the users.

When an organization computing system determines to interact with the LPTGC Conversion system to obtain monetary-based benefits based on the loyalty program provided by the organization (e.g., on behalf of a user affiliated with the organization, such as in response to a corresponding request or instruction from the user), an LPTGC Conversion system interacter component 277 communicates with the LPTGC Conversion system, such as an executing program that will programmatically interact with the LPTGC Conversion system by invoking appropriate functionality in an API (not shown) provided by the LPTGC Conversion system. As previously discussed, the components of the LPTGC Conversion system will then provide corresponding functionality as appropriate, such as to facilitate creation of gift certificates for one or more item ordering systems 290 of merchants and to facilitate use of created gift certificates to acquire items from the item ordering systems, as well as to optionally provide various monitoring information regarding use of the LPTGC Conversion system's functionality by the organization. In this illustrated embodiment, the LPTGC Conversion system is independent of any single merchant from which items will be acquired using monetary benefits based on the loyalty program of an organization, although in other embodiments the LPTGC Conversion system may instead be provided by or otherwise affiliated with a particular such merchant.

In addition, as part of providing its functionality, the LPTGC Conversion system may further interact with users via the computing systems 250, such as to establish accounts for the users with one or more merchants and/or to obtain information from the users in order to complete acquisitions of items from the merchants. In some embodiments, such interactions by the LPTGC Conversion system with the users are performed so as to maintain a consistent interface being provided to the users during interactions with one or more of the organization computing systems and with the interactions with the LPTGC Conversion system, such as by the LPTGC Conversion system using stored organization information 221 to provide information that when presented to the users appears similar (e.g., substantially similar or identical) to the information from one of the organizations when presented to the user.

Those skilled in the art will appreciate that computing systems 200, 250 and 270 are merely illustrative and are not intended to limit the scope of the present invention. Computing system 200 may instead be comprised of multiple interacting computing systems or devices, and may be connected to other devices that are not illustrated, including through one or more networks such as the Internet or via the World Wide Web ("Web"). More generally, a "client" or "server" computing system or device may comprise any combination of hardware or software that can interact in the described manners, including (without limitation) desktop or other computers, network devices, PDAs, cellphones, cordless phones, devices with walkie-talkie and other push-to-talk capabilities, pagers, electronic organizers, Internet appliances, television-based systems (e.g., using set-top boxes and/or personal/digital video recorders), and various other consumer products that include appropriate inter-communication capabilities. In addition, the functionality provided by the illustrated LPTGC Conversion system components may in some embodiments be combined in fewer components or distributed in additional components. Similarly, in some embodiments the functionality of some of the illustrated components may not be provided and/or other additional functionality may be available.

Those skilled in the art will also appreciate that, while various items are illustrated as being stored in memory or on storage while being used, these items or portions of them can be transferred between memory and other storage devices for purposes of memory management and data integrity. Alternatively, in other embodiments some or all of the software components and/or modules may execute in memory on another device and communicate with the illustrated computing system via inter-computer communication. Some or all of the system components or data structures may also be stored (e.g., as software instructions or structured data) on a computer-readable medium, such as a hard disk, a memory, a network, or a portable media article to be read by an appropriate drive or via an appropriate connection. The system components and data structures can also be transmitted via generated data signals (e.g., by being encoded in a carrier wave or otherwise included as part of an analog or digital propagated signal) on a variety of computer-readable transmission mediums, including wireless-based and wired/cable-based mediums, and can take a variety of forms (e.g., as part of a single or multiplexed analog signal, or as multiple discrete digital packets or frames). Such computer program products may also take other forms in other embodiments. Accordingly, the present invention may be practiced with other computer system configurations.

Figure 3:
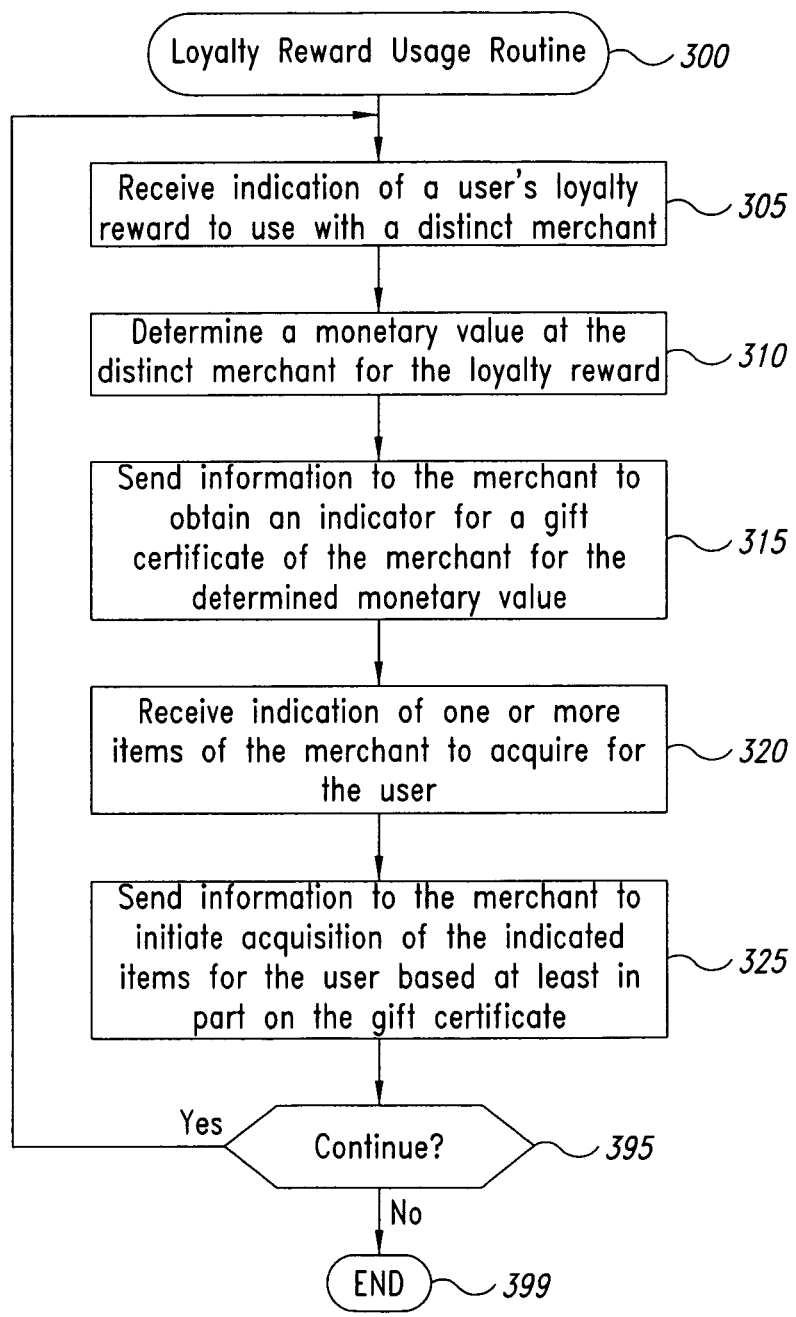
FIG. 3 is a flow diagram of an embodiment of a Loyalty Reward Usage routine.

FIG. 3 is a flow diagram of an embodiment of a Loyalty Reward Usage routine 300. The routine may, for example, be provided by a computing system of an organization providing a loyalty program to users affiliated with the organization (e.g., a merchant providing a loyalty program to customers of the merchant), such as a computing system of one of the merchants 100 of FIG. 1 or one of the organization computing systems 270 of FIG. 2. In the illustrated embodiment, the routine interacts with one or more merchants to obtain and use gift certificates from the merchants based on loyalty program rewards from the organization performing the method.

The routine begins in step 305, where an indication is received of a loyalty program reward earned by a user from the organization that is to be used in a monetary manner with a distinct merchant, such as an indication received from the user based on an interaction with a Web page provided to the user from a computing system of the organization. The routine then continues to step 310 to determine a monetary value at the merchant for the indicated loyalty program reward—in some embodiments, however, the monetary value determination is made prior to receiving the indication in step 305, such as if one or more options were provided to the user for using specified loyalty program rewards of the user to receive specified monetary values, and if the indication in step 305 is based on a selection by the user of one of the options.

In the illustrated embodiment, the merchant provides its own LPTGC conversion functionality, and thus the routine continues in step 315 by sending information to the merchant to cause a gift certificate from the merchant having a monetary value as determined in step 310 to be dynamically created, with the routine receiving an indication of a unique indicator for the created gift certificate from the merchant. The sent information may include various pieces of information in various embodiments (e.g., an indication of the determined monetary value, identity information for the organization, information about the user, information about the specified loyalty program reward, etc.), and the sending may be performed in various ways (e.g., in a programmatic manner, such as by using an API provided by the merchant).

After receiving one or more indications of items to be acquired from the merchant in step 320, the routine continues to step 325 to send information to the merchant to initiate acquisition of those items using the created gift certificate. As with step 315, the sent information may include various pieces of information in various embodiments (e.g., an indication of the items, identity information for the organization, information about the user, the received indicator for the gift certificate to be used, etc.), and the sending may be performed in various ways (e.g., in a programmatic manner, such as by using an API provided by the merchant). In addition, the indications of the items may be received at other times in other embodiments, such as in step 305 if information previously provided to the user included information about one or more items available from the merchant.

The routine then continues to step 395 to determine whether to continue. If so, the routine returns to step 305, and if not continues to step 399 and ends. As the routine is performed multiple times for one or more users, the routine may in some embodiments interact with multiple different merchants to facilitate acquiring items from those merchants. In addition, while not illustrated here, the routine may provide a variety of additional types of functionality in other embodiments, including interacting with one or more merchants to monitor use of loyalty program rewards from the organization at that merchant. Moreover, in some embodiments the routine may interact with a merchant in a manner to support a shopping cart model at the merchant, such as by adding one or more items to a shopping cart of a user at the merchant, and then initiating a checkout process for the items in the shopping cart.

Figure 4:
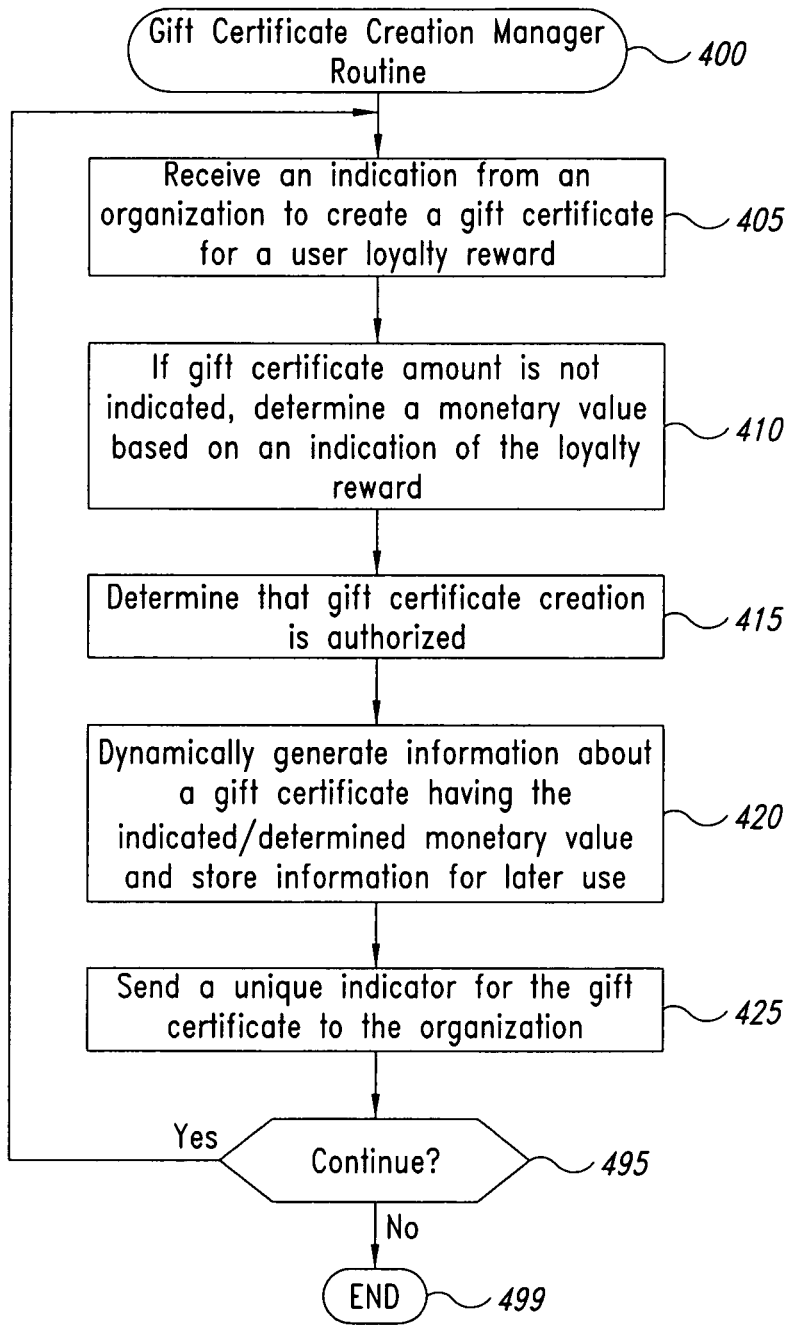
FIG. 4 is a flow diagram of an embodiment of a Gift Certificate ("GC") Creation Manager routine.

FIG. 4 is a flow diagram of an embodiment of a GC Creation Manager routine 400. The routine may, for example, be provided by execution of an embodiment of the GC Creation Manager component 184 of FIG. 1 and/or of the GC Creation Manager component 242 of FIG. 2, such as to in this illustrated embodiment dynamically create gift certificates of a merchant based on loyalty program rewards of a distinct organization. In the illustrated embodiment, the routine is performed by a merchant who provides its own LPTGC conversion functionality, although in other embodiments this or a similar routine could be performed as part of an independent LPTGC Conversion system that interacts with multiple distinct merchants.

The routine begins at step 405, where an indication is received from an organization to create a gift certificate corresponding to a loyalty program reward of a user affiliated with the organization. The indication may be received, for example, based on a programmatic interaction from the organization, such as previously discussed with respect to step 315 of FIG. 3, and may include various types of information as indicated with respect to that step. In optional step 410, if the organization did not provide an indication of the monetary value for the gift certificate, the routine attempts to determine a monetary value to use, such as based on an indication of the loyalty program reward being used and a predefined mapping for the organization that provides a monetary value corresponding to the loyalty program reward, although in some embodiments the organization may supply the monetary value to use in all such situations.

In step 415, the routine then determines whether the indicated gift certificate creation is authorized, such as based on authenticating the identity of the organization and/or validating that the organization is authorized to perform this type of activity and to have a gift certificate created in the indicated amount—if the gift certificate creation is not authorized (not shown), an error message may be sent to the organization and the routine may return to step 405 or continue to step 495. The routine then continues to step 420 to create the gift certificate, which in the illustrated embodiment involves storing corresponding information about the gift certificate without creating a physical paper, card or other embodiment corresponding to the gift certificate, although in other embodiments gift certificates may be created in other manners (e.g., by creating an appropriate physical embodiment of the gift certificate). In step 425, a unique indicator for the gift certificate is then sent to the organization for later use, although in other embodiments the created gift certificate may instead be immediately used at the merchant to obtain a benefit corresponding to the amount of the gift certificate.

The routine then continues to step 495 to determine whether to continue. If so, the routine returns to step 405, and if not continues to step 499 and ends. As the routine is performed multiple times, the routine may in some embodiments interact with multiple different organizations to facilitate creating gift certificates based on distinct loyalty programs from each of those organizations. In addition, while not illustrated here, the routine may provide a variety of additional types of functionality in other embodiments.

Figure 5:
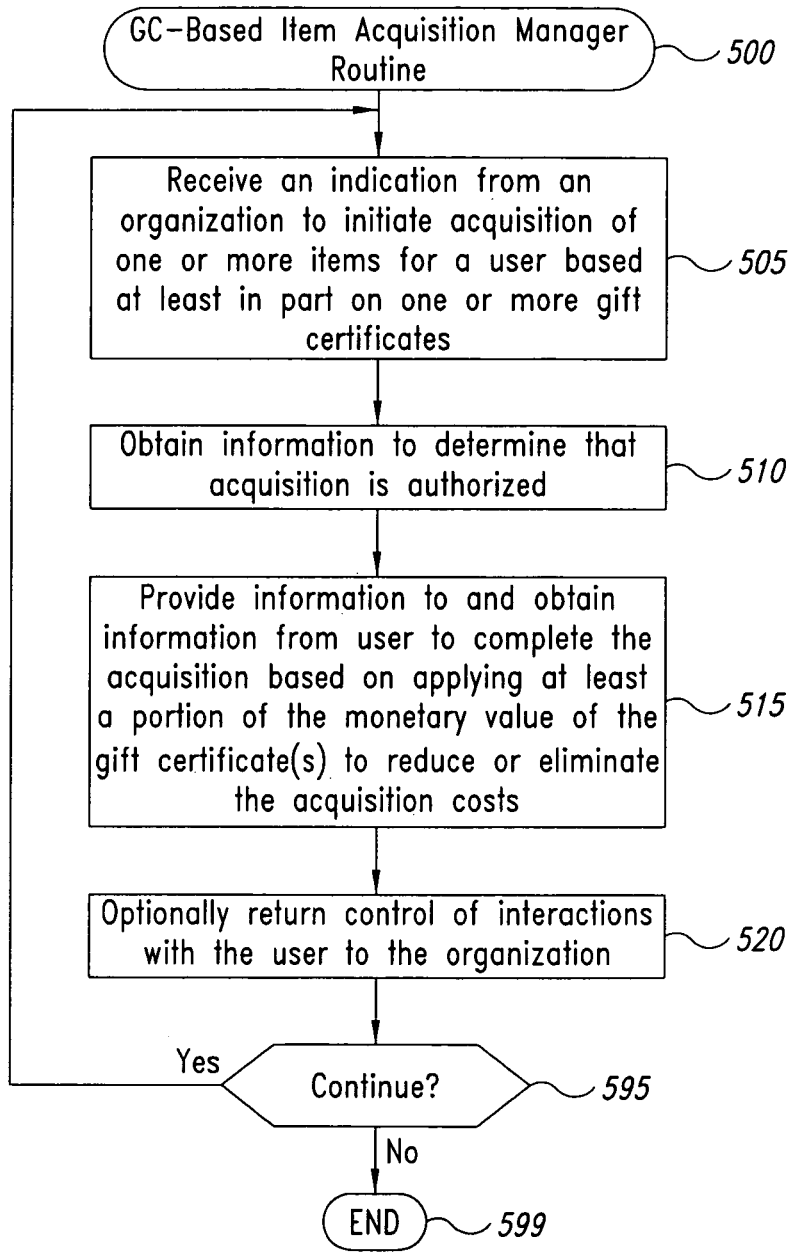
FIG. 5 is a flow diagram of an embodiment of a GC-Based Item Acquisition Manager routine.

FIG. 5 is a flow diagram of an embodiment of a GC-Based Item Acquisition Manager routine 500. The routine may, for example, be provided by execution of an embodiment of the GC-Based Item Acquisition Manager component 186 of FIG. 1 and/or of the GC-Based Item Acquisition Manager component 244 of FIG. 2, such as to in this illustrated embodiment dynamically complete the acquisition of one or more items from the merchant by using one or more gift certificates created for a distinct organization to eliminate or otherwise reduce the cost of the acquisition. In the illustrated embodiment, the routine is performed by a merchant who provides its own LPTGC conversion functionality, although in other embodiments this or a similar routine could be performed as part of an independent LPTGC Conversion system that interacts with multiple distinct merchants.

The routine begins at step 505, where an indication is received from an organization to initiate acquisition of one or more items from the merchant by using one or more gift certificates from the merchant created for the organization. The indication may be received, for example, based on a programmatic interaction from the organization, such as previously discussed with respect to step 325 of FIG. 3, and may include various types of information as indicated with respect to that step. In embodiments in which shopping cart functionality of the merchant is being used by the organization, the received indication may identify a particular shopping cart of a customer of the merchant that is to be checked out.

In step 510, the routine then obtains information to determine whether the indicated item acquisition is authorized, such as based on authenticating the identity of the organization and/or validating that the organization is authorized to perform this type of activity—if the item acquisition is not authorized (not shown), an error message may be sent to the organization and the routine may return to step 505 or continue to step 595. In addition, as discussed in greater detail elsewhere, in some embodiments additional techniques are used to ensure that the item acquisition is authorized, such as by receiving in step 505 a set of information that was previously provided to the organization (e.g., based on adding items to a shopping cart at the merchant) and by verifying that the information is correct (e.g., by comparing the received set of information to a new set of information that is dynamically generated based on current conditions). In addition, in some embodiments the routine may directly interact with a user of the organization on whose behalf the item acquisition is to be performed, such as to authenticate the identity of the user (e.g., based on a password and/or other information available to the merchant based on prior interactions with the user).

The routine then continues to step 515 to complete the item acquisition if possible, which in this illustrated embodiment involves interacting with the user to provide and/or obtain information corresponding to the item acquisition (e.g., payment source information if the gift certificate(s) being used do not cover the full cost of acquiring the one or more items), although in other embodiments the item acquisition process may be completed in other manners (e.g., by using stored information for the user and/or the organization without performing any additional interactions). In at least some embodiments, the interactions with the user are performed so as to minimize or eliminate indications to the user that the interactions are with the merchant rather than with the organization. In addition, as part of the item acquisition, information about the one or more gift certificates indicated in step 505 is retrieved and used for the item acquisition, such as to eliminate or otherwise reduce the cost of the acquisition. Information about the item acquisition transaction is then stored, such as to later be available to the user and/or the organization, although in other embodiments at least some information about the transaction may be immediately provided to the organization. In addition, information about the gift certificates that are used is updated, such as to indicate that the gift certificates are no longer valid. The routine then continues to step 520 to optionally return control of interactions with the user to the organization.

The routine next continues to step 595 to determine whether to continue. If so, the routine returns to step 505, and if not continues to step 599 and ends. As the routine is performed multiple times, the routine may in some embodiments interact with multiple different organizations to facilitate item acquisitions based on created gift certificates. In addition, while not illustrated here, the routine may provide a variety of additional types of functionality in other embodiments.

Figure 6:
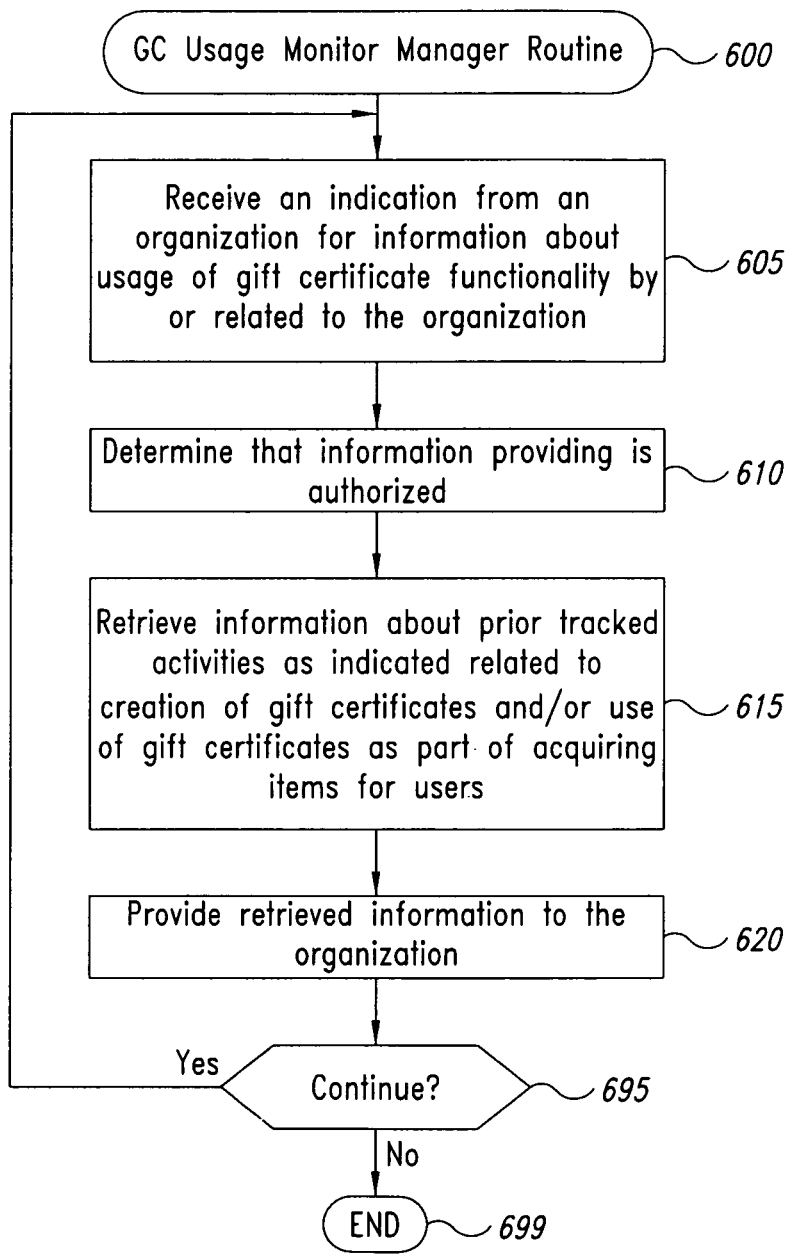
FIG. 6 is a flow diagram of an embodiment of a GC Usage Monitor Manager routine.

FIG. 6 is a flow diagram of an embodiment of a GC Usage Monitor Manager routine 600. The routine may, for example, be provided by execution of an embodiment of the GC Usage Monitor Manager component 188 of FIG. 1 and/or of the GC Usage Monitor Manager component 248 of FIG. 2, such as in this illustrated embodiment to provide information to an organization regarding the organization's use of the merchant's functionality to use loyalty program rewards of the organization. In the illustrated embodiment, the routine is performed by a merchant who provides its own LPTGC conversion functionality, although in other embodiments this or a similar routine could be performed as part of an independent LPTGC Conversion system that interacts with multiple distinct merchants.

The routine begins at step 605, where an indication is received from an organization to request information regarding the organization's use of the merchant's functionality to use loyalty program rewards of the organization. The request may be received, for example, from an administrative user at the organization and/or in an automated manner, such as based on a scheduled periodic request for such information. In step 610, the routine then obtains information to determine whether the request for the information is authorized, such as based on authenticating the identity of the organization and/or validating that the organization is authorized to perform this type of activity—if the information request is not authorized (not shown), an error message may be sent to the organization and the routine may return to step 605 or continue to step 695.

The routine then continues to step 615 to retrieve stored information corresponding to the request, such as regarding creation of gift certificates using loyalty program rewards from the organization and/or use of created gift certificates as part of transactions to acquire items from the merchant. A variety of other types of information for the merchant may also be retrieved in at least some embodiments, such as information about an account of the organization with the merchant related to the functionality provided by the merchant to use the loyalty program rewards. In step 620, the routine then provides the retrieved information to the organization, such as by programmatically sending the information to a computing system of the organization.

The routine next continues to step 695 to determine whether to continue. If so, the routine returns to step 605, and if not continues to step 699 and ends. As the routine is performed multiple times, the routine may in some embodiments interact with multiple different organizations to report information to those organizations regarding their relevant activities with the merchant. In addition, while not illustrated here, the routine may provide a variety of additional types of functionality in other embodiments.

Those skilled in the art will also appreciate that in some embodiments the functionality provided by the routines discussed above may be provided in alternative ways, such as being split among more routines or consolidated into fewer routines. Similarly, in some embodiments illustrated routines may provide more or less functionality than is described, such as when other illustrated routines instead lack or include such functionality respectively, or when the amount of functionality that is provided is altered. In addition, while various operations may be illustrated as being performed in a particular manner (e.g., in serial or in parallel, or synchronous or asynchronous) and/or in a particular order, those skilled in the art will appreciate that in other embodiments the operations may be performed in other orders and in other manners. Those skilled in the art will also appreciate that the data structures discussed above may be structured in different manners, such as by having a single data structure split into multiple data structures or by having multiple data structures consolidated into a single data structure. Similarly, in some embodiments illustrated data structures may store more or less information than is described, such as when other illustrated data structures instead lack or include such information respectively, or when the amount or types of information that is stored is altered.

From the foregoing it will be appreciated that, although specific embodiments have been described herein for purposes of illustration, various modifications may be made without deviating from the spirit and scope of the invention. Accordingly, the invention is not limited except as by the appended claims and the elements recited therein. In addition, while certain aspects of the invention are presented below in certain claim forms, the inventors contemplate the various aspects of the invention in any available claim form. For example, while only some aspects of the invention may currently be recited as being embodied in a computer-readable medium, other aspects may likewise be so embodied.

The invention claimed is:

1. A computer-implemented method for a merchant to dynamically use non-monetary loyalty rewards of a distinct organization to facilitate provision of items from the merchant, the method comprising:

receiving in a computing system of a merchant an indication to use with the merchant a specified non-monetary loyalty reward of an organization distinct from the merchant, the indication being received from a distinct computing system of the organization to initiate dynamic creation by the merchant of a gift certificate associated with the merchant that corresponds to the specified non-monetary loyalty reward, and the specified non-monetary loyalty reward being associated with a user affiliated with the organization;

automatically determining a monetary value for the merchant to associate with the specified loyalty reward;

in response to the received indication and under control of a computing system of the merchant, dynamically enabling use of the determined monetary value for acquiring items from the merchant, the dynamic enabling including dynamically creating the gift certificate to have a specified monetary amount based on the determined monetary value; and providing an indication of the dynamically created gift certificate to enable use of the dynamically created gift certificate; and after receiving an instruction from the computing system of the organization to use the created gift certificate as part of acquiring one or more indicated items from the merchant for the user, applying at least a portion of the specified monetary amount from the created gift certificate to reduce a price for the acquiring of the one or more indicated items from the merchant.

2. The method of claim 1 wherein the specified monetary amount of the dynamically created gift certificate is the determined monetary value, and wherein the dynamic creating of the gift certificate includes enabling immediate use of the determined monetary value from the dynamically created gift certificate for the acquiring of the one or more indicated items from the merchant.

3. The method of claim 1 wherein the dynamic creating of the gift certificate associated with the merchant includes automatically determining the specified a monetary amount of the created gift certificate based on the determined monetary value.

4. The method of claim 3 wherein the dynamic enabling of the use of the determined monetary value further includes storing information about the dynamically created gift certificate, and wherein the providing of the indication of the dynamically created gift certificate includes providing the indication to the computing system of the organization, the stored information for the gift certificate enabling later use of the gift certificate as part of the acquiring of the one or more indicated items from the merchant.

5. The method of claim 1 wherein the user affiliated with the organization is a customer of the merchant, and wherein the dynamic creating of the gift certificate includes associating the created gift certificate with the customer of the merchant and includes storing information to allow later use of the created gift certificate with the merchant on behalf of the customer.

6. The method of claim 1 wherein the creating of the gift certificate associated with the merchant includes storing information regarding the gift certificate to enable use of the gift certificate without generating a physical embodiment of the gift certificate.

7. The method of claim 1 wherein the dynamic enabling of the use of the determined monetary value includes creating a credit for use in reducing an amount to be paid to the merchant, the credit having an amount that is at least a portion of the determined monetary value.

8. The method of claim 7 further including receiving an indication to associate the credit with an indicated customer of the merchant, and reducing an amount to be paid from the indicated customer to the merchant by the amount of the credit.

9. The method of claim 1 wherein the receiving of the indication includes receiving an indication of the monetary value, and wherein the determining of the monetary value to associate with the specified loyalty reward includes using that indicated monetary value.

10. The method of claim 1 wherein the determining of the monetary value to associate with the specified loyalty reward includes retrieving predefined information for the organization and selecting the monetary value based at least in part on the retrieved information.

11. The method of claim 1 wherein the determining of the monetary value to associate with the specified loyalty reward includes programmatically obtaining related information from a third party and selecting the monetary value based at least in part on the obtained information.

12. The method of claim 1 wherein the determining of the monetary value to associate with the specified loyalty reward is based at least in part on one or more of current market conditions for the merchant related to at least one of the one or more indicated items, current market conditions for the merchant that are not specific to the one or more indicated items, a currency in which to represent the monetary value, and the user affiliated with the organization.

13. The method of claim 1 wherein the dynamic enabling of the use of the determined monetary value includes sending information to the user that appears to be from the organization.

14. The method of claim 13 wherein the sent information includes one or more Web pages that have a visual representation when displayed that is based on a visual representation of one or more Web pages previously sent to the user from the organization.

15. The method of claim 1 wherein the dynamic enabling of the use of the determined monetary value includes generating a set of information based on the user affiliated with the organization acquiring the one or more indicated items and providing the generated set of information to the computing system of the organization, and including, after the receiving of the instruction to use the created gift certificate as part of the acquiring of the one or more indicated items from the merchant for the user, verifying that a newly generated set of information based on the user acquiring the one or more indicated items matches a set of information provided from the organization with the received instruction.

16. The method of claim 1 wherein the specified loyalty reward of the organization is a specified number of loyalty program points.

17. The method of claim 1 wherein the organization is another merchant distinct from the merchant, wherein the user affiliated with the organization is a customer of the another merchant, and wherein the indication received from the computing system of the another merchant includes an indication of the customer.

18. The method of claim 1 wherein the computing system of the merchant further receives additional indications from multiple distinct organizations to use specified loyalty rewards of those organizations in a monetary manner with the merchant, and further including, in response to each of the additional indications, dynamically enabling use of a determined monetary amount at the merchant based on the specified loyalty reward for the additional indication.

19. The method of claim 18 wherein determining of a monetary amount for each of the specified loyalty rewards is performed dynamically, and wherein the determined monetary amount for a loyalty reward is based on conditions at a time of the determining and/or on information specific to the loyalty reward.

20. The method of claim 1 wherein the indication received from the computing system of the organization includes information about the one or more indicated items from the merchant, the received information about the one or more indicated items being based on indications previously sent to the organization of multiple items available from the merchant.

21. The method of claim 20 wherein the indications of the multiple items available from the merchant that were previously sent to the organization are in response to one or more requests from the organization regarding a subset of a plurality of items available from the merchant that are selected by the organization to make available to affiliated users to be acquired using loyalty rewards from the organization.

22. The method of claim 21 wherein the merchant is affiliated with multiple other merchants from which items are available to be acquired via the merchant, and wherein the subset of items includes at least one item from at least one of the other merchants.

23. The method of claim 1 wherein the merchant is affiliated with multiple other merchants from which items are available to be acquired via the merchant, wherein at least one of the one or more indicated items are available to be acquired from at least one of the other merchants via the merchant, and wherein the applying of the at least portion of the specified monetary amount from the created gift certificate includes initiating fulfillment of an order for the at least one indicated items from the at least one other merchants.

24. The method of claim 1 wherein the computing system of the organization is associated with a physical transaction device accessible to users, wherein the received indication is based on the user affiliated with the organization interacting with the transaction device to provide information about the specified non-monetary loyalty reward earned by the user from the organization, and wherein the dynamic enabling of the use of the determined monetary value includes providing a physical embodiment of a gift certificate to the user from the transaction device.

25. The method of claim 1 wherein the computing system of the merchant is associated with a physical transaction device accessible to users, and including, for each of multiple users and after one or more interactions of the user with the transaction device that indicate how the merchant is to be compensated for a specified monetary amount, automatically and dynamically enabling use by the user of a gift certificate having the monetary amount.

26. The method of claim 25 wherein the dynamic enabling of use for each of at least some of the users of a gift certificate having a monetary amount includes providing a physical embodiment of the gift certificate to the user from the transaction device.

27. The method of claim 25 wherein the indicating of how the merchant is to be compensated for a specified monetary amount by each of at least some of the users includes indicating a payment source from which the merchant can obtain monetary compensation based on the specified monetary amount.

28. The method of claim 1 wherein the receiving of the indication to use the specified non-monetary loyalty reward includes receiving information about the one or more indicated items of the merchant, and wherein the determining of the monetary value to associate with the specified loyalty reward is based at least in part on a cost of acquiring the one or more indicated items.

29. The method of claim 28 wherein the applying of the at least portion of the specified monetary amount from the created gift certificate includes providing the one or more indicated items to an indicated recipient.

30. A computing system configured to dynamically create gift certificates of a merchant to facilitate acquisition of items from the merchant, comprising:
one or more processors;
a gift certificate creation manager component configured to, when executed by at least one of the one or more processors, and after receiving an indication that a gift certificate is to be created, programmatically interact with one or more computing systems of a merchant to cause a gift certificate of the merchant to be created dynamically, the created gift certificate having a monetary value that is based at least in part on a specified compensation corresponding to a non-monetary loyalty reward available from an organization distinct from the merchant; and
an item acquisition manager component configured to, when executed by at least one of the one or more processors, and after receiving an indication to use the created gift certificate to acquire one or more items from the merchant, dynamically initiate acquisition of the one or more items from the merchant using the created gift certificate, at least a portion of the monetary value of the gift certificate being for use in reducing a price for acquiring the one or more items.

31. The computing system of claim 30 wherein the non-monetary loyalty reward is a specified number of loyalty program points.

32. The computing system of claim 31 wherein the indication is received from and/or on behalf of a user having the specified number of loyalty program points.

33. The computing system of claim 31 wherein the loyalty program points are from the organization.

34. The computing system of claim 30 further comprising a gift certificate usage manager component configured to, after receiving a request from an entity for information about prior use of one or more gift certificates whose monetary values are each based at least in part on a specified number of loyalty program points of the entity, provide the requested information to the entity.

35. The computing system of claim 30 wherein the dynamic creating of the gift certificate is performed automatically in response to the received indication and includes causing information about the gift certificate to be stored to enable use of the gift certificate without a physical embodiment of the gift certificate.

36. The computing system of claim 30 wherein the indication is received from a computing system affiliated with a physical transaction device, and wherein the dynamic creating of the gift certificate is performed automatically in response to the received indication and includes dynamically generating a physical embodiment of the gift certificate at the physical transaction device.

37. The computing system of claim 30 wherein the gift certificate creation manager component and the item acquisition manager component each include software instructions for execution by the at least one processor of the computing system.

38. The computing system of claim 30 wherein the gift certificate creation manager component and the item acquisition manager component are affiliated with the organization.

39. The computing system of claim 30 wherein the gift certificate creation manager component consists of a means for, after receiving an indication that a gift certificate is to be created, programmatically interacting with one or more computing systems of a merchant to cause a gift certificate of the merchant to be created dynamically, the created gift certificate having a monetary value that is based at least in part on a specified compensation corresponding to a non-monetary loyalty reward available from the organization, and wherein the item acquisition manager component consists of a means for, after receiving an indication to use the created gift certificate to acquire one or more items from the merchant, dynamically initiating acquisition of the one or more items from the merchant using the created gift certificate, at least a portion of the monetary value of the gift certificate being for use in reducing a price for acquiring the one or more items.

40. The computing system of claim 30 wherein the gift certificate creation manager component is further configured to cause gift certificates of multiple distinct merchants to be dynamically created based on programmatic interactions.

41. A computer-readable medium whose contents include instructions that when executed configure a computing device to dynamically create gift certificates of a merchant to facilitate acquisition of items from the merchant, by performing a method comprising:
   under control of the configured computing device, the configured computing device being operated by an organization, facilitating interactions with a merchant distinct from the organization by,
      receiving an indication that a gift certificate is to be created;
      after the receiving of the indication that the gift certificate is to be created, programmatically interacting with one or more computing systems of the merchant to cause a gift certificate of the merchant to be created dynamically, the created gift certificate having a monetary value that is based at least in part on compensation specified by the organization;
      receiving an indication to use the created gift certificate to acquire one or more items from the merchant; and
      after the receiving of the indication to use the created gift certificate to acquire the one or more items from the merchant, dynamically initiating acquisition of the one or more items from the merchant using the created gift certificate, at least a portion of the monetary value of the gift certificate being used for reducing a price for acquiring the one or more items.

42. The computer-readable medium of claim 41 wherein the specified compensation is a specified number of loyalty program points.

43. The computer-readable medium of claim 42 wherein the indication that the gift certificate is to be created is received from a user who has received the specified number of loyalty program points as compensation for actions of the user.

44. The computer-readable medium of claim 42 wherein the loyalty program points are provided by the organization.

45. The computer-readable medium of claim 41 wherein the specified compensation is a specified non-monetary loyalty reward of the organization, and wherein the method further comprises automatically determining the monetary value for the created gift certificate based on the specified non-monetary loyalty reward.

46. The computer-readable medium of claim 45 wherein the programmatic interacting by the computing device with the one or more computing systems of the merchant includes indicating the specified non-monetary loyalty reward to the merchant, and wherein the automatic determining of the monetary value for the created gift certificate is performed under control of the one or more computing systems of the merchant.

47. The computer-readable medium of claim 45 wherein the automatic determining of the monetary value for the created gift certificate is performed under control of the computing device, and wherein the programmatic interacting by the computing device with the one or more computing systems of the merchant includes indicating the determined monetary value to the merchant.

48. The computer-readable medium of claim 45 wherein the automatic determining of the monetary value to associate with the specified loyalty reward includes retrieving predefined information for the organization and selecting the monetary value based at least in part on the retrieved information.

49. The computer-readable medium of claim 45 wherein the automatic determining of the monetary value for the specified loyalty reward is based at least in part on current market conditions for the merchant related to at least one of the one or more items.

50. The computer-readable medium of claim 45 wherein the automatic determining of the monetary value for the specified loyalty reward is based at least in part on current market conditions for the merchant that are not specific to the one or more items.

51. The computer-readable medium of claim 45 wherein the automatic determining of the monetary value for the specified loyalty reward is based at least in part on a user for whom the one or more items from the merchant are acquired.

52. The computer-readable medium of claim 41 wherein the programmatic interacting with the one or more computing systems of the merchant includes indicating a customer of the merchant with whom to associate the created gift certificate for later use.

53. The computer-readable medium of claim 52 wherein the programmatic interacting with the one or more computing systems of the merchant further includes receiving a set of information from the merchant that is generated based on the customer and for use with the created gift certificate, and wherein the dynamic initiating of the acquisition of the one or more items from the merchant occurs after the receiving of the set of information from the merchant that is generated for use with the created gift certificate and includes supplying to the merchant that received set of information and an indication of a user on whose behalf the acquiring of the one or more items is performed, the supplied set of information and the supplied indication of the user to enable the merchant to verify that a newly generated set of information based on the indicated user matches the supplied set of information.

54. The computer-readable medium of claim 41 wherein the received indication that the gift certificate is to be created is received from a physical transaction device, and wherein the dynamic creating of the gift certificate includes dynamically generating a physical embodiment of the gift certificate at the physical transaction device.

55. The computer-readable medium of claim 41 wherein the specified compensation is associated with a user affiliated with the organization, wherein the received indication that the gift certificate is to be created is based on one or more interactions of the user with a computing system of the organization, and wherein the one or more computing systems of the merchant further send information to the user to enable the user to acquire items from the merchant based at least in part on the created gift certificate, the sent information appearing to be from the organization.

56. The computer-readable medium of claim 55 wherein the sent information includes one or more Web pages that have a visual representation when displayed that is based on a visual representation of one or more Web pages previously sent to the user from the organization.

57. The computer-readable medium of claim 55 wherein the received indication to use the created gift certificate to acquire the one or more items from the merchant is based on one or more further interactions by the user with the sent information.

58. The computer-readable medium of claim 41 wherein the programmatic interacting with the one or more computing systems of the merchant further includes receiving information from the merchant about items available from the merchant for acquisition, the indicated items including the one or more items, and wherein the received indication to use the created gift certificate to acquire the one or more items from the merchant is based at least in part on the received information about the available items.

59. The computer-readable medium of claim 58 wherein the specified compensation is associated with a loyalty reward of the organization that is provided to a user affiliated with the organization, and wherein the one or more items are part of a subset of the items available from the merchant that is selected by the organization to be available to affiliated users for acquisition using loyalty rewards from the organization.

60. The computer-readable medium of claim 59 wherein the merchant is affiliated with multiple other merchants from which items are available to be acquired via the merchant, and wherein the subset of items includes at least one item from at least one of the other merchants.

61. The computer-readable medium of claim 41 wherein the merchant is affiliated with multiple other merchants from which items are available to be acquired via the merchant, and wherein at least one of the one or more items to be acquired from the merchant are from at least one of the other merchants via the merchant.

62. The computer-readable medium of claim 41 wherein the computing device is part of a physical transaction device accessible to users, wherein the received indication that the gift certificate is to be created is based on a user interacting with the transaction device to provide information about a loyalty reward earned by the user from the organization, and wherein the method further includes determining the specified compensation based on the loyalty reward, and providing a physical embodiment of the created gift certificate to the user from the transaction device, the gift certificate having an amount corresponding to the monetary value.

63. The computer-readable medium of claim 41 wherein the computing device is part of a physical transaction device accessible to users, and wherein the method further includes, after one or more interactions of the user with the transaction device that indicate the specified compensation, automatically and dynamically enabling use by the user of the created gift certificate.

64. The computer-readable medium of claim 63 wherein the dynamic enabling of the use by the user of the created gift certificate includes providing a physical embodiment of the created gift certificate to the user from the transaction device.

65. The computer-readable medium of claim 63 wherein the one or more interactions of the user with the transaction device that indicate the specified compensation indicate a payment source of monetary compensation with at least the monetary value of the created gift certificate.

66. The computer-readable medium of claim 41 wherein the computer-readable medium is a memory of the computing device.

* * * * *

UNITED STATES PATENT AND TRADEMARK OFFICE
CERTIFICATE OF CORRECTION

PATENT NO. : 8,620,739 B1  
APPLICATION NO. : 11/004701  
DATED : December 31, 2013  
INVENTOR(S) : Robert Frederick et al.

It is certified that error appears in the above-identified patent and that said Letters Patent is hereby corrected as shown below:

Title Page:

Item (56), col. 1, page 2, line 7:
"Points.com Inc. "Exchange Guide," retrieved November 17, 2004, from http://points.com/exchangeGuide.jsp?com.points.common.util.Ht-tpSynchronizerToken.token=39059921221927919, 2 pages." should read, --Points.com Inc. "Exchange Guide," retrieved November 17, 2004, from http://points.com/exchangeGuide.jsp?com.points.common.util.HttpSynchronizerToken.token=39059921221927919, 2 pages.--.

Item (56), col. 1, page 2, line 10:
"Points.com Inc., "Exchange Guide – Make an Exchange for Gift Certificates," retrieved November 17, 2004, from http://points.com/exchangeGuide5.jsp?com.points.common.util.Ht-tpSynchronizerToken.token=39059921221966593, 2 pages." should read, --Points.com Inc., "Exchange Guide – Make an Exchange for Gift Certificates," retrieved November 17, 2004, from http://points.com/exchangeGuide5.jsp?com.points.common.util.HttpSynchronizerToken.token=39059921221966593, 2 pages.--.

Item (56), col. 2, page 2, line 3:
"Points.com Inc., "Exchange Options," retrieved November 17, 2004, from http://points.com/CategoriesList.jsp?com.points.common.util.Ht-tpSynchronizerToken.token=39059921222076469, 2 pages." should read, --Points.com Inc., "Exchange Options," retrieved November 17, 2004, from http://points.com/CategoriesList.jsp?com.points.common.util.HttpSynchronizerToken.token=39059921222076469, 2 pages.--.

Signed and Sealed this  
Fifteenth Day of July, 2014

Michelle K. Lee  
*Deputy Director of the United States Patent and Trademark Office*

CERTIFICATE OF CORRECTION (continued)
U.S. Pat. No. 8,620,739 B1

In the Claims:

Column 19, Lines 48-49:
"the gift certificate associated with the merchant includes automatically determining the specified a monetary amount of the" should read, --the gift certificate associated with the merchant includes automatically determining the specified monetary amount of the--.